(12) United States Patent
Takeuchi

(10) Patent No.: US 12,726,818 B2
(45) Date of Patent: Sep. 1, 2026

(54) INFORMATION PROCESSING APPARATUS HAVING WIRELESS NETWORK CONFIGURATION BASED ON AUTHENTICATION METHOD OF WLAN ROUTER, METHOD OF CONTROLLING INFORMATION PROCESSING APPARATUS AND STORAGE MEDIUM

(71) Applicant: CANON KABUSHIKI KAISHA, Tokyo (JP)

(72) Inventor: Takuya Takeuchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 18/369,333

(22) Filed: Sep. 18, 2023

(65) Prior Publication Data

US 2024/0107309 A1 Mar. 28, 2024

(30) Foreign Application Priority Data

Sep. 26, 2022 (JP) ................................ 2022-152637

(51) Int. Cl.
*H04L 9/00* (2022.01)
*H04L 9/32* (2006.01)
(Continued)

(52) U.S. Cl.
CPC ......... *H04W 12/069* (2021.01); *H04W 76/10* (2018.02); *H04W 84/12* (2013.01)

(58) Field of Classification Search
CPC ............................ H04W 12/069; H04W 76/10
(Continued)

(56) References Cited

U.S. PATENT DOCUMENTS 8,516,579 B2 8/2013 Nagasaki et al.
8,607,048 B2 12/2013 Nogawa
(Continued)

FOREIGN PATENT DOCUMENTS

JP 2011-197864 A 10/2011
JP 2011-199458 A 10/2011
(Continued)

OTHER PUBLICATIONS

Japanese Office Action dated May 26, 2026, in related Japanese Patent Application No. 2022-152637.

*Primary Examiner* — Haresh N Patel
(74) *Attorney, Agent, or Firm* — VENABLE LLP

(57) ABSTRACT

A method of controlling an information processing apparatus includes receiving a predetermined operation, and based on that a wireless local area network (LAN) router to which the information processing apparatus is connected at a time of the reception of the predetermined operation corresponds to an enterprise method which is an authentication method using an authentication server conforming to IEEE 802.1X protocol, displaying information related to the enterprise method, receiving setting information for connecting to the wireless LAN router corresponding to the enterprise method, and transmitting the setting information to a communication apparatus. If the wireless LAN router is connected at the time of the reception of the predetermined operation corresponds to a personal method which is an authentication method not using the authentication server, transmitting, to the communication apparatus, connection information for connecting to the wireless LAN router corresponding to the personal method.

19 Claims, 13 Drawing Sheets

(51) Int. Cl.
*H04W 12/069* (2021.01)
*H04W 76/10* (2018.01)
*H04W 84/12* (2009.01)

(58) Field of Classification Search
USPC ........................................................ 726/6
See application file for complete search history.

(56) References Cited

U.S. PATENT DOCUMENTS 9,143,939 B2 9/2015 Nagasaki et al.
9,280,305 B2 * 3/2016 Takasu ..................... G07G 1/14
9,311,048 B1 * 4/2016 Kapoor ............... G06F 16/1727
9,456,294 B2 9/2016 Suzuki
9,838,390 B2 12/2017 Zakaria
10,523,672 B2 12/2019 Zakaria
11,683,307 B2 6/2023 Zakaria
2007/0245039 A1 * 10/2007 Dahneke ............... G06F 9/4411 710/15
2010/0214603 A1 * 8/2010 Tamura .............. H04N 1/00912 358/1.15
2012/0064204 A1 * 3/2012 Davila ................... A21D 13/47 358/1.14
2013/0100486 A1 * 4/2013 Mccoog ............ H04N 1/00222 358/1.15
2016/0262442 A1 * 9/2016 Davila .................... A23P 20/15
2016/0278426 A1 * 9/2016 Davila .................. G06F 3/1253
2016/0278427 A1 * 9/2016 Davila .................... A23P 20/20
2017/0164200 A1 * 6/2017 Näslund .............. H04W 12/069
2017/0265515 A1 * 9/2017 Davila .................... A23P 20/20
2018/0063373 A1 * 3/2018 Hardy .................. H04N 1/4413
2018/0203755 A1 * 7/2018 Das ..................... G06F 11/0709
2020/0137568 A1 * 4/2020 Takeuchi .............. H04W 12/03
2020/0159947 A1 * 5/2020 Shenefiel ............ H04L 63/1425

FOREIGN PATENT DOCUMENTS

JP 2013-239906 A 11/2013
JP 2015019267 A * 1/2015
JP 2018-517319 A 6/2018
JP 2021-100165 A 7/2021

* cited by examiner

WIRELESS SETUP (EAP-TTLS) SCREEN

AUTHENTICATION PROTOCOL MSCHAP

USERNAME 701

PASSWORD 702

CANCEL OK 703 704

FIG.7

INFORMATION PROCESSING APPARATUS HAVING WIRELESS NETWORK CONFIGURATION BASED ON AUTHENTICATION METHOD OF WLAN ROUTER, METHOD OF CONTROLLING INFORMATION PROCESSING APPARATUS AND STORAGE MEDIUM

BACKGROUND

Field

The present disclosure relates to a network connection technique.

Description of the Related Art

A personal method and an enterprise method are known as connection methods for a wireless local area network (LAN). The personal method is a method for performing communications through data encryption using a pre-shared key, and the enterprise mode is a method for performing communications after authentication using an authentication server conforming to the IEEE 802.1X protocol. To connect a network communication device using the personal method, the connection can be done using a service set identifier (hereinafter called SSID) and a pre-shared key. Meanwhile, to connect a network communication device using the enterprise method, an authentication method, an authentication protocol, a username, a password, and the like need to be set, which problematically imposes high load on the setup.

As a technique for facilitating the setup, Japanese Patent Laid-Open No. 2011-199458 (Literature 1) describes a technique of performing the setup by determining the authentication method based on information obtained from an access point.

SUMMARY

There are demands for a technique for facilitating network connection setup.

A control method for controlling an information processing apparatus according to an aspect of the present disclosure includes: receiving a predetermined operation; and based on that a wireless local area network (LAN) router to which the information processing apparatus is connected at a time of the reception of the predetermined operation corresponds to an enterprise method which is an authentication method using an authentication server conforming to IEEE 802.1X protocol, transmitting, to a communication apparatus, information related to the enterprise method and connection information for connecting to the wireless LAN router corresponding to the enterprise method or based on that the wireless LAN router to which the information processing apparatus is connected at the time of the reception of the predetermined operation corresponds to a personal method which is an authentication method not using the authentication server, transmitting, to the communication apparatus, connection information for connecting to the wireless LAN router corresponding to the personal method.

Further features of the present invention will become apparent from the following description of exemplary embodiments with reference to the attached drawings.

BRIEF DESCRIPTION OF THE DRAWINGS

FIG. 4 is a diagram showing the relationship of FIGS. 4A and 4B;

FIG. 7 is a wireless setup (EAP-TTLS) screen;

FIG. 10 is a diagram showing the relationship of FIGS. 10A and 10B;

DESCRIPTION OF THE EMBODIMENTS

Embodiment 1

Preferred embodiments of the present disclosure are described in detail below with reference to the drawings attached hereto. Note that the embodiments below are not intended to limit the present disclosure according to the scope of claims, and not all the combinations of features described in the present embodiments are necessarily essential as solutions of the present disclosure.

Figure 1A:
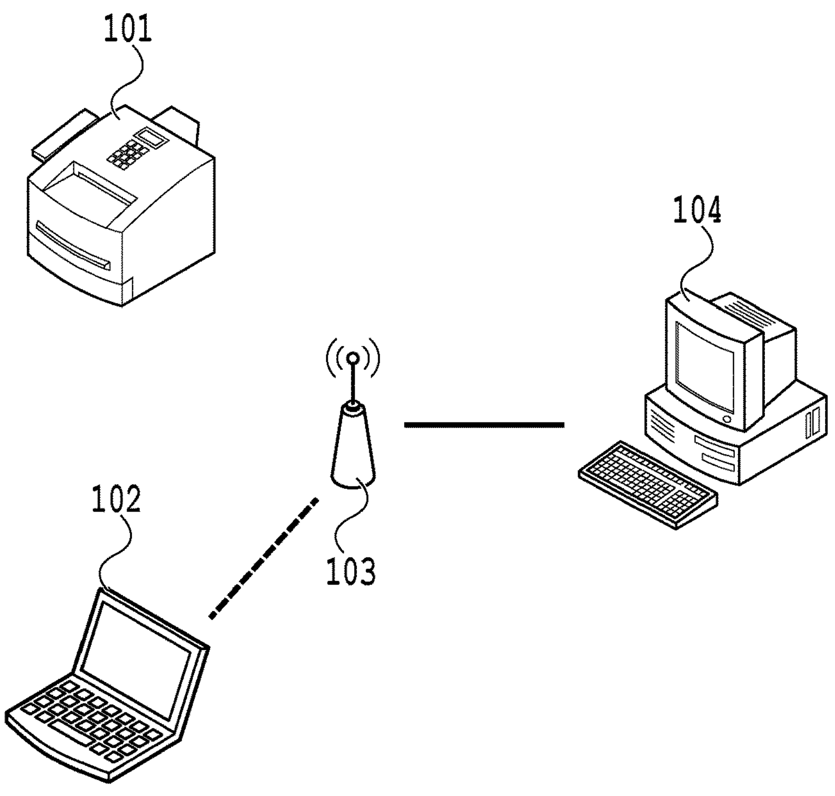
FIGS. 1A and 1B show conceptual images of how a printer and an information processing apparatus are connected.
Figure 1B:
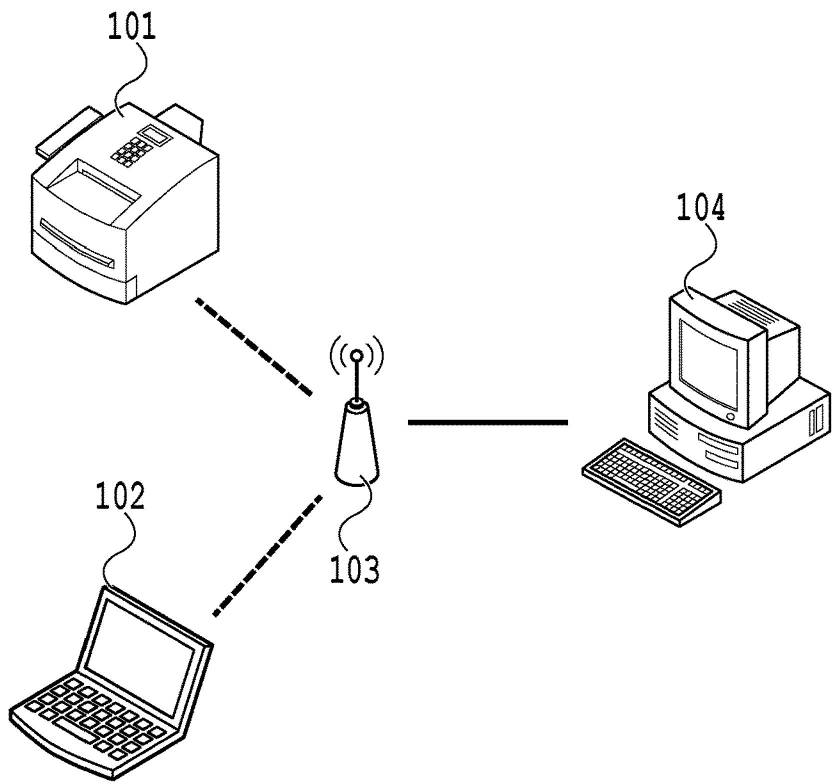

FIGS. 1A and 1B are diagrams illustrating how an information processing apparatus, a router apparatus, and a printer are connected in the present embodiment.

FIG. 1A is a state where an information processing apparatus 102 and a router device 103 are connected to each other via a wireless LAN, with the router device 103 being connected to an authentication server 104. The information processing apparatus 102 has a wireless LAN communication function, and communications for connection setup processing is performed wirelessly in this state.

Next, FIG. 1B is a state in which the network setting processing has been performed on a printer 101 after the state in FIG. 1A. In this state, the printer 101 is wirelessly connected to the router device 103, authenticated by an authentication server 104.

The following describes connection setup processing performed to set up the printer (printing apparatus) 101 from the unconnected state shown in FIG. 1A in which the printer 101 is not connected to the wireless network to the connected state shown in FIG. 1B.

Figure 2:
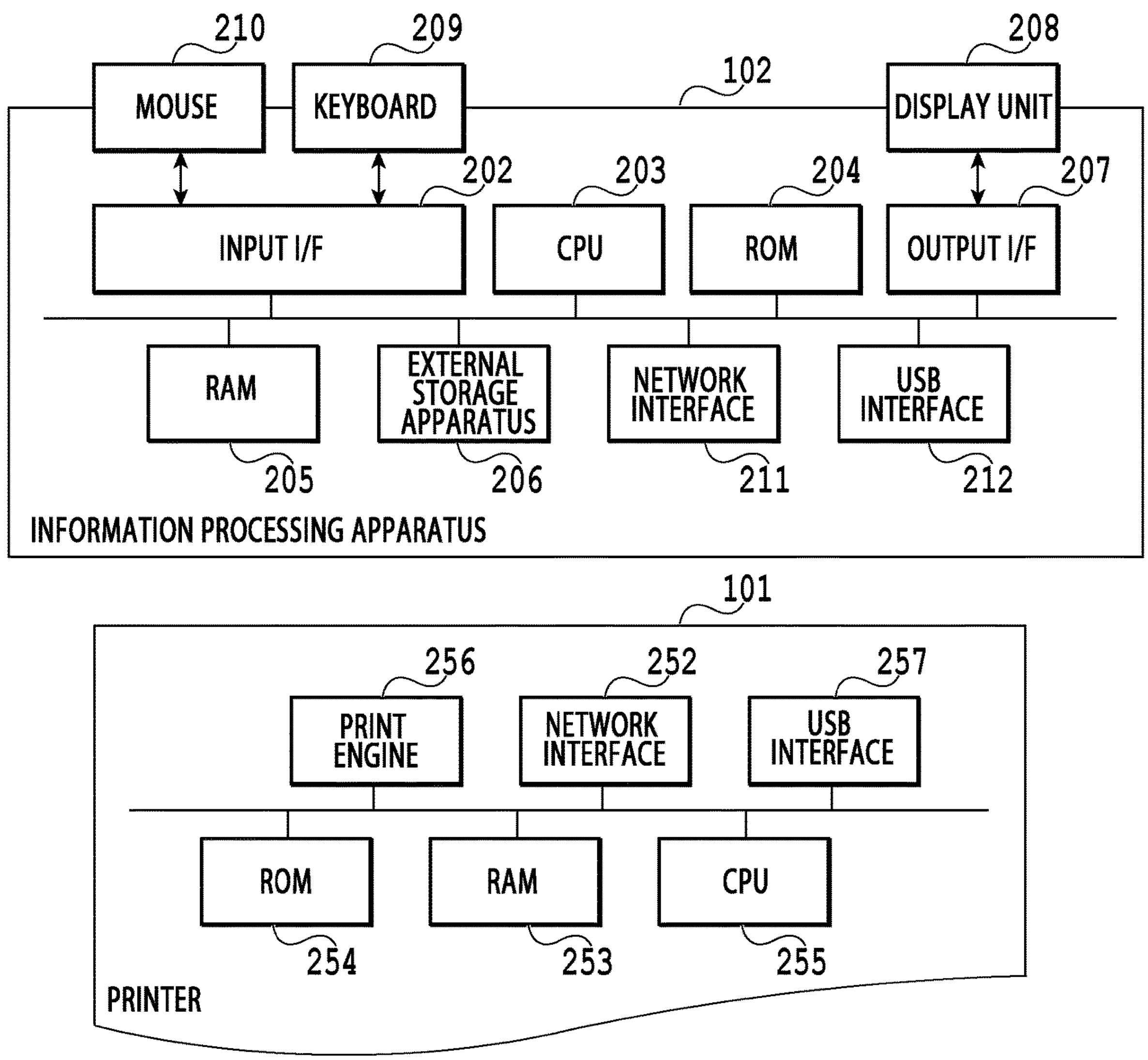
FIG. 2 is a diagram showing an example of device configurations.

First, FIG. 2 is used to describe the hardware configurations of the information processing apparatus 102 and the printer 101.

The information processing apparatus 102 has an input I/F 202, a CPU 203, a ROM 204, a RAM 205, an external storage apparatus 206, an output I/F 207, a display unit 208, a keyboard 209, and a mouse 210. The information processing apparatus 102 also has a network interface 211 and a USB interface 212.

The CPU 203 is a central processing unit for controlling the units of the information processing apparatus 102. The ROM 204 is memory in which to store and from which to read programs that the CPU 203 can run on the information processing apparatus 102. The RAM 205 is used as work memory by various programs stored in the external storage apparatus 206. The RAM 205 also serves as work memory needed by the CPU 203 in executing programs. The input I/F 202 receives input from a user via an interface such as, for example, the mouse 210 or the keyboard 209. The output I/F 207 is an interface for performing display control of the display unit 208 such as a display.

The network interface 211 controls processing for wireless communications and wired communications via a LAN cable. The USB interface 212 controls USB connection via a USB cable. As the operating system (OS), the following description uses Microsoft Windows (registered trademark) as an example. For the wireless communications, the present embodiment uses a communications standard of the IEEE 802.11 series. The communications standard of the IEEE 802.11 series is, in other words, a Wi-Fi (registered trademark) communications standard. Note that the network interface 211 may control communications conforming to communications standards other than the communications standard of the IEEE 802.11 series. Examples of the other communications standards include Bluetooth® Classic, Bluetooth Low Energy, and near-field communication.

The printer 101 has a network interface (I/F) 252, a RAM 253, a print engine 256, a ROM 254, and a CPU 255. The network interface 252 controls processing for wireless communications and wired communications via a LAN cable. A USB interface 257 controls USB connection via a USB cable. The RAM 253 is used as main memory and work memory of the CPU 255, and stores various kinds of data or a reception buffer for temporarily storing the received print job or print data. The print engine 256 performs printing based on data saved in the RAM 253. The ROM 254 has various control programs and data used by the control programs, and the CPU 255 controls the units of the printer 101 according to these control programs. Note that the hardware configuration of the authentication server 104 shown in FIGS. 1A and 1B is the same as that of the information processing apparatus 102 and is therefore not described here. Also, the hardware configurations of the information processing apparatus 102 and the printer 101 are not limited to the modes described above, and may be other modes.

Figure 3:
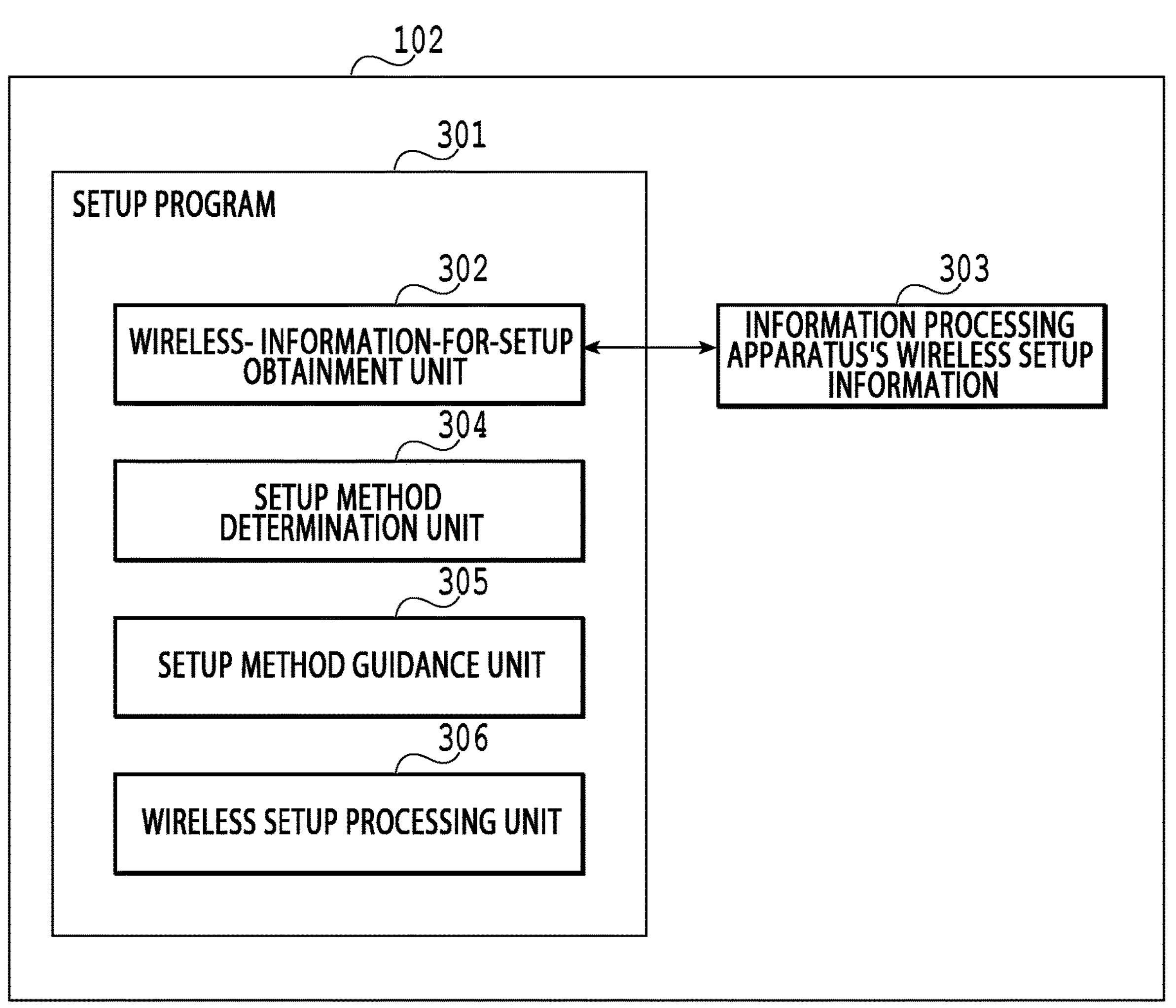
FIG. 3 is a diagram showing an example software configuration.

FIG. 3 is a diagram showing the software configuration of the present embodiment. As shown in FIG. 3, the information processing apparatus 102 has a setup program 301 for performing wireless setup. The setup program 301 has a wireless-information-for-setup obtainment unit 302, a setup method determination unit 304, a setup method guidance unit 305, and a wireless setup processing unit 306. The wireless-information-for-setup obtainment unit 302 obtains wireless information for setup from wireless setup information 303 on the information processing apparatus 102. The wireless setup information is information used by the information processing apparatus 102 to connect to a wireless LAN router 103. The wireless setup information includes information on a service set identifier (hereinafter called SSID) of the wireless LAN router 103, a passphrase, an encryption method used, a frequency band, and an authentication method or the authentication protocol for the authentication server. The setup method determination unit 304 checks the wireless information for setup obtained and determines a necessary setup method. The setup method guidance unit 305 presents a necessary setup method based on the result of the determination made by the setup method determination unit 304. The wireless setup processing unit 306 performs wireless setup based on the wireless information for setup obtained from the wireless-information-for-setup obtainment unit 302 and the setup method presented by the setup method guidance unit 305.

Connection methods for the wireless connection setup include a personal method which performs communications through encryption using a pre-shared key and an enterprise method which performs communications after authentication by an authentication server conforming to the IEEE 802.1X protocol. In other words, the personal method is an authentication method that does not use an authentication server, and the enterprise method is an authentication method that uses an authentication server.

In a case where the connection method is the enterprise method, items that need to be set differ depending on the authentication method.

For example, in a case where the authentication method is Extensible Authentication Protocol-Transport Layer Security (EAP-TLS), registration of a client certificate and registration of a certificate authority (CA) certificate are needed. Also, in a case where the authentication method is Extensible Authentication Protocol-Tunneled Transport Layer Security (EAP-TTLS), selection of an authentication protocol, setting of a username and a password, and registration of a CA certificate are needed. Note that authentication protocols include Microsoft Challenge-Handshake Authentication Protocol (MSCHAP) and Password Authentication Protocol (PAP).

What is discussed in the present embodiment is clarification of setup performed in a case where the connection method is the enterprise method. Specifically, in an event where wireless connection setup of a network communication device is performed from an information processing apparatus, an authentication method or an authentication protocol is determined based on the network connection information on the information processing apparatus, and a setup guidance is presented according to the method determined. Based on a flowchart, the following describes details of the setup program 301 for executing the above.

As an example of wireless connection setup, the present embodiment describes an example where the information processing apparatus 102 displays a setup screen for the printer 101 based on the network connection information on the information processing apparatus 102 and performs connection processing.

Figure 4A:
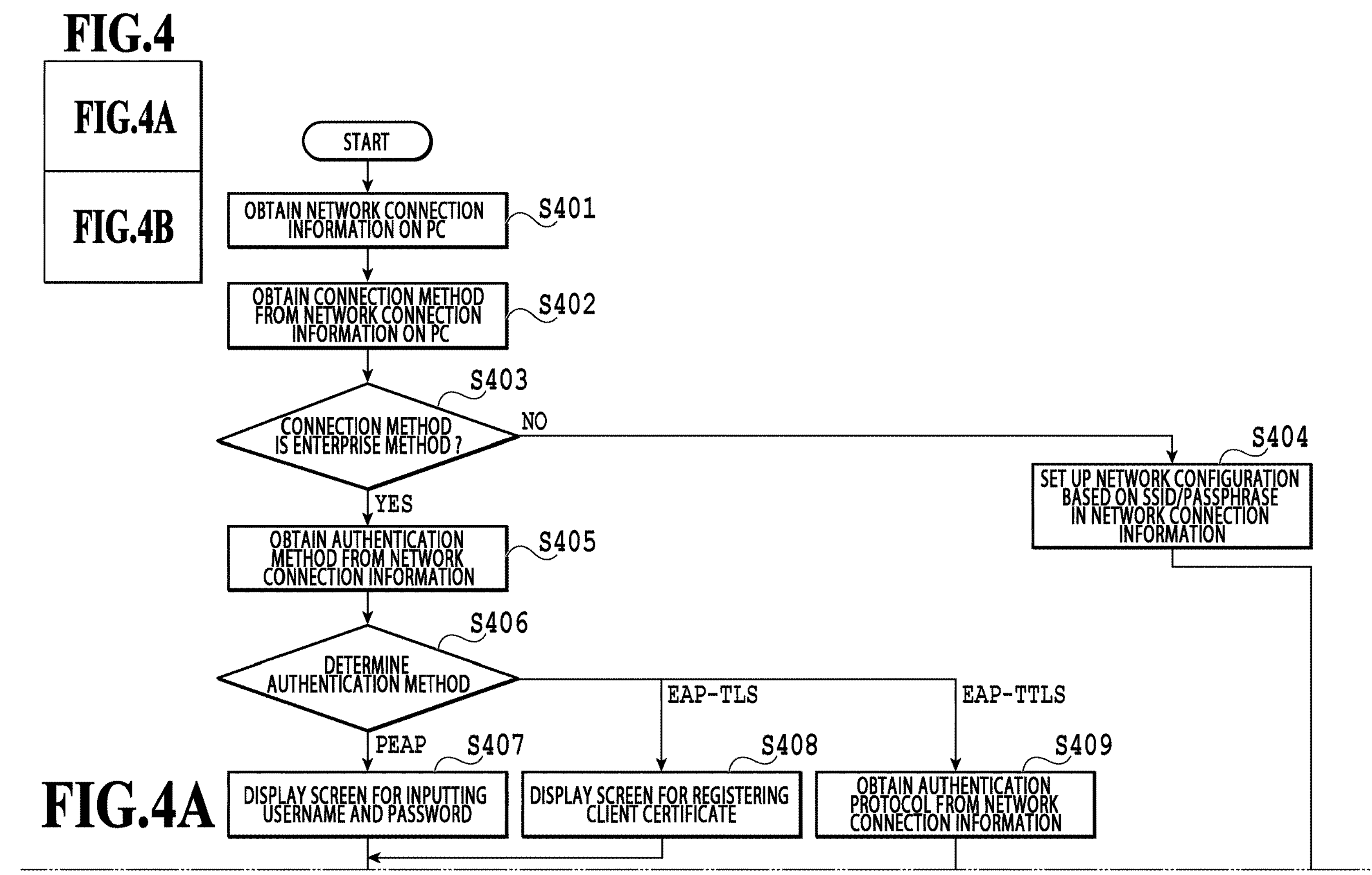
FIGS. 4A and 4B are flowcharts showing the procedure of wireless setup.
Figure 4B:
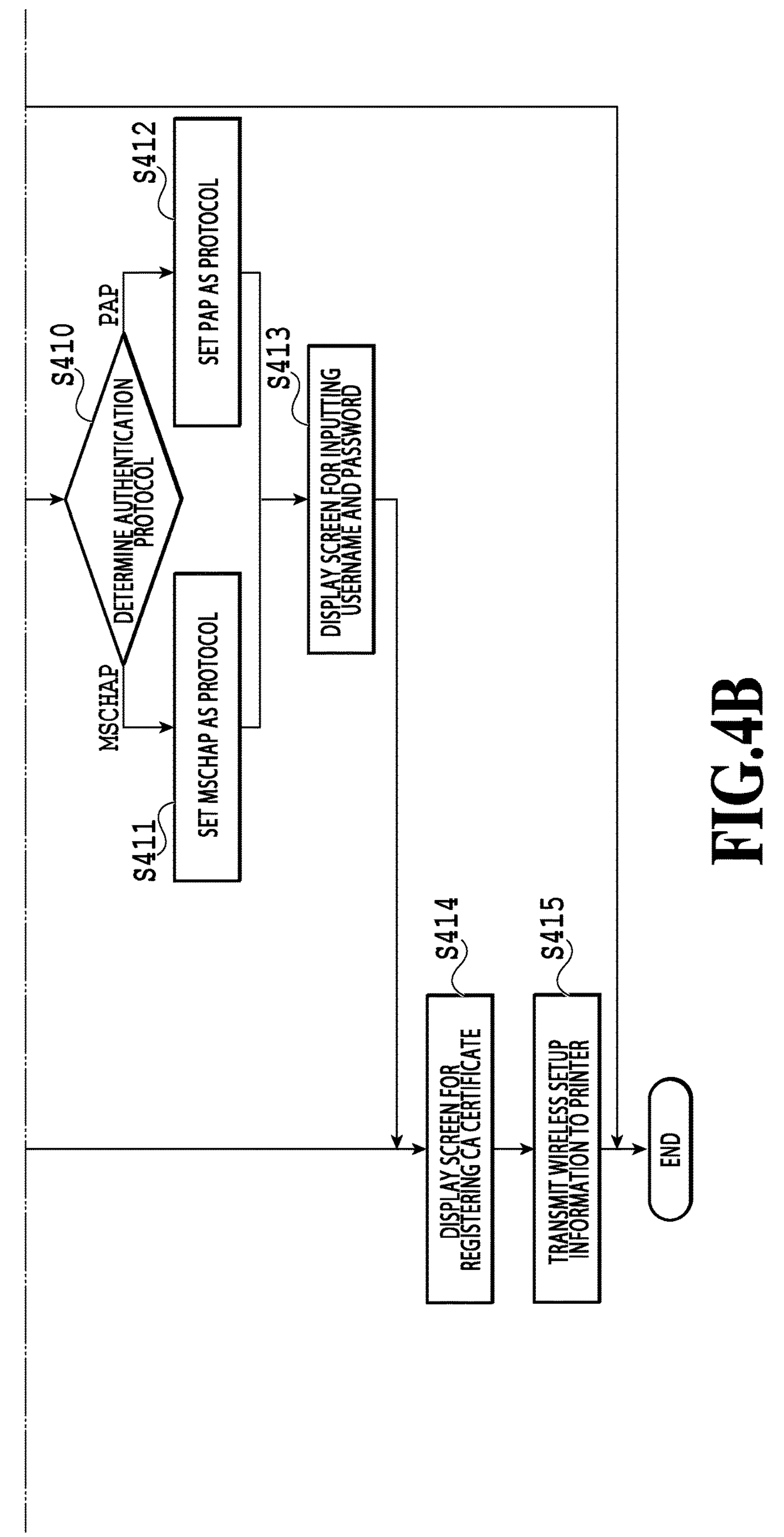

FIG. 4 is a diagram showing the relationship of FIGS. 4A and 4B. FIGS. 4A and 4B are flowcharts performed in a case where the information processing apparatus 102 performs enterprise setup processing with respect to the printer 101. This processing is performed by the CPU 203 of the information processing apparatus by loading the setup program 301 stored in the external storage apparatus 206 into the RAM 205 and executing the setup program 301. This flowchart starts processing in response to an execution instruction from the CPU 203. The symbol "S" used in the following description of processing in the flowchart means that the processing is a step in the flowchart. The following describes a series of processes sequentially, with the CPU 203 being the main unit performing the processes. The present flowchart is started once a predetermined operation for setting up wireless connection of the printer 101 is executed on a screen displayed by the setup program 301.

First, in S401, using an application program interface (hereinafter called API) of the OS, the CPU 203 obtains network connection information on the wireless LAN router 103 to which the information processing apparatus 102 is currently connected. The wireless LAN router 103 to which the information processing apparatus 102 is currently connected is, in other words, the wireless LAN router 103 to which the information processing apparatus 102 is being connected at the time of the execution of the predetermined operation. Note that the network connection information may be saved in a storage unit (not shown) in the information processing apparatus 102 itself in advance and obtained from the storage unit in the processing of this step. After that, the CPU 203 switches the connection destination of the information processing apparatus 102 from the wireless LAN router 103 to the printer 101 which is the wireless setup target. Note that the printer as the wireless setup target is identified by, for example, the following method. First, a user performs an operation for causing the printer as the wireless setup target to operate in a wireless setup mode, and the printer starts operating in the wireless setup mode. The wireless setup mode is a mode in which the printer operates as a software access point forming a network having a predefined SSID. Then, the CPU 203 searches for a network having the predefined SSID and thereby identifies the printer operating in the wireless setup mode. By connecting to the software access point forming the network having the predefined SSID, the information processing apparatus 102 is connected to the printer operating in the wireless setup mode. In the following description, communications between the information processing apparatus 102 and the printer are carried out via the connection between the information processing apparatus 102 and the printer thus established.

Note that the present disclosure is not limited to the mode where the connection destination of the information processing apparatus 102 is switched from the wireless LAN router 103 to the printer as the wireless setup target. For example, the information processing apparatus 102 may be connected to the printer using a communications standard different from the Wi-Fi communications standard while maintaining the connection to the wireless LAN router 103 conforming to the Wi-Fi communications standard. Then, in the following description, communications between the information processing apparatus 102 and the printer may be executed by communications via the connection conforming to the different communications standard. Examples of the different communications standard include Bluetooth Classic, Bluetooth Low Energy, and near-field communication.

Next, in S402, the CPU 203 obtains, from the obtained wireless setup information, information for identifying whether the connection method of the wireless LAN router 103 corresponding to this wireless setup information is the personal method or the enterprise method. From S403, the CPU 203 proceeds to different steps depending on the connection method identified based on the information obtained in S402. The processing proceeds to S404 in a case of the personal method, and proceeds to S405 in a case of the enterprise method.

In S404, the CPU 203 sets up network configuration for the printer based on the network connection information. Specifically, the CPU 203 displays a screen for receiving, from the user, input of a password for connecting to the network corresponding to the network connection information, and receives the input. Then, the CPU 203 sends the printer the SSID of the network corresponding to the network connection information and the password inputted. Note that the SSID is included in the network connection information. As a result, the printer is connected to the wireless LAN router 103 based on the SSID and the password received, the wireless LAN router 103 being an apparatus forming the network corresponding to the network connection information and an apparatus corresponding to the information. After that, the processing of the present flowchart ends. Note that after the above-described information is transmitted to the printer 101, the CPU 203 may switch the connection destination of the information processing apparatus 102 from the printer 101 as the wireless setup target to the wireless LAN router 103.

In S405, the CPU 203 obtains, from the network connection information, information for identifying the authentication method for the wireless LAN router 103 corresponding to the network connection information. In S406, the CPU 203 determines the authentication method based on the information obtained in S405. The processing proceeds to S407 if the authentication method is Protected Extensible Authentication Protocol (PEAP), proceeds to S408 if the authentication method is EAP-TLS, and proceeds to S409 if the authentication method is EAP-TTLS.

In S407, the CPU 203 displays and controls a display screen for the authentication method PEAP. In other words, the CPU 203 displays an input screen for receiving input of a username and a password.

Figure 5:
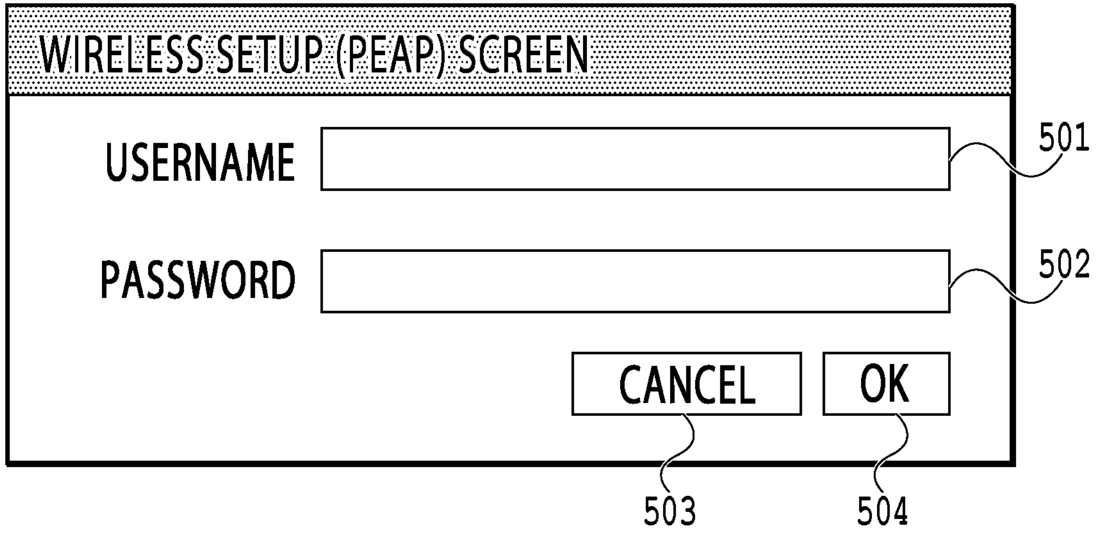
FIG. 5 is a wireless setup (PEAP) screen.

FIG. 5 is a diagram showing a setup screen displayed in a case where the authentication method is PEAP. The PEAP setup screen has a control 501 where a username can be inputted, a control 502 where a password can be inputted, a cancel button 503, and an OK button 504. The control 501 and the control 502 receive input of a username and a password used for authentication. In the present processing, the CPU 203 ends the setup processing if the cancel button 503 is pressed, and proceeds to processing in S414 if the OK button 504 is pressed. Note that the OK button 504 may be controlled to become pressable after receipt of user input to the control 501 and the control 502.

In S408, the CPU 203 displays and controls a display screen for the authentication method EAP-TLS. Specifically, the CPU 203 displays a screen for registering a client certificate.

Figure 6:
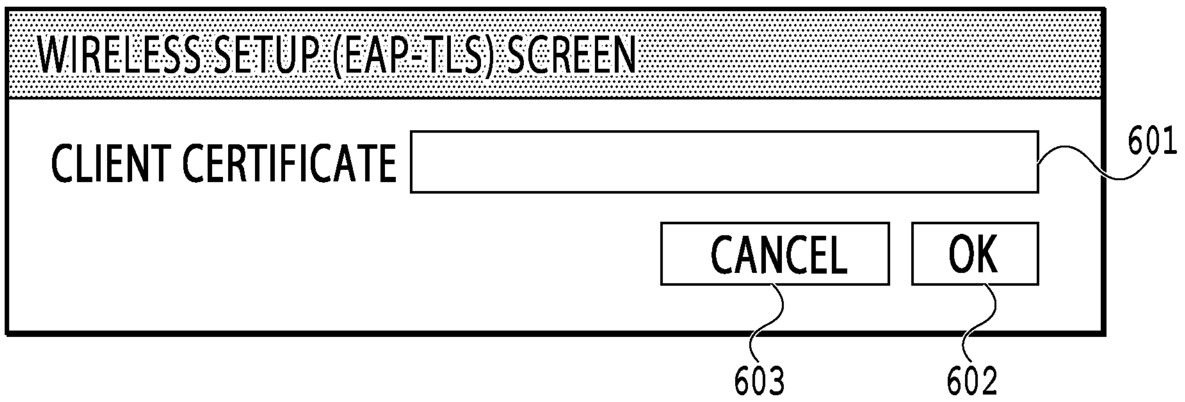
FIG. 6 is a wireless setup (EAP-TLS) screen.

FIG. 6 shows a setup screen displayed in a case where the authentication method is EAP-TLS. The EAP-TLS setup screen has a control 601 where the storage location of a client certificate can be inputted, an OK button 602, and a cancel button 603. The control 601 receives a setting of a folder path storing the client certificate used for authentication. The CPU 203 ends the setup processing if the cancel button 603 is pressed, and proceeds to processing in S414 if the OK button 602 is pressed. Although the present embodiment describes a mode of inputting a folder path storing a client certificate, a dialog screen for opening a file may be displayed to receive a selection. Also, the OK button 602 may be controlled to become pressable after receipt of input of a folder path to the control 601.

In S409, the CPU 203 obtains authentication protocol information from the network connection information. Next, in S410, the CPU 203 determines whether the authentication protocol is MSCHAP or PAP based on the authentication protocol information obtained in S409. The CPU 203 proceeds to S411 if the authentication protocol is MSCHAP and determines that MSCHAP is the authentication protocol to set for the printer. The CPU 203 proceeds to S412 if the authentication protocol is PAP and determines that PAP is the authentication protocol to set for the printer. In S413, the CPU 203 displays an input screen for receiving input of a username and a password.

Figure 7:
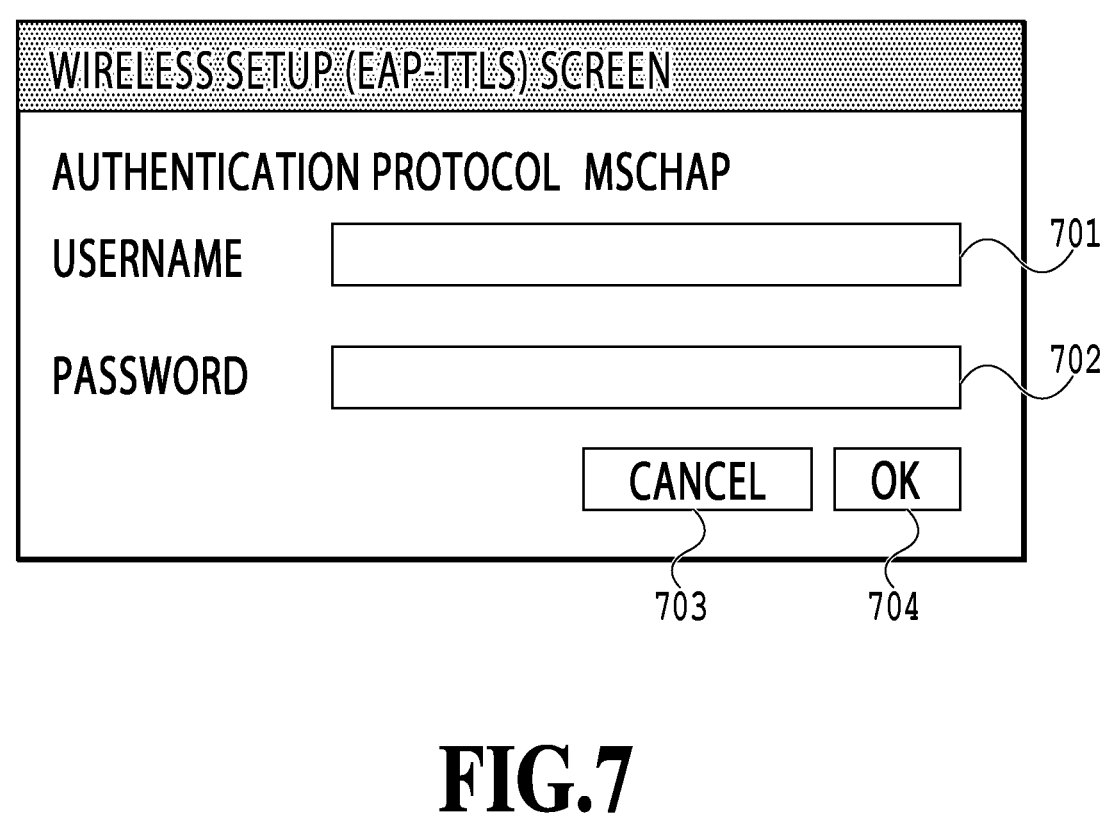

FIG. 7 is a diagram showing a setup screen displayed in a case where the authentication method is EAP-TTLS. The EAP-TTLS setup screen has a control 701 where a username can be inputted, a control 702 where a password can be inputted, a cancel button 703, and an OK button 704. The control 701 and the control 702 receive input of a username and a password used for authentication. The CPU 203 ends the setting processing if the cancel button 703 is pressed, and proceeds to processing in S414 if the OK button 704 is pressed. Note that the OK button 704 may be controlled to become pressable after receipt of user input to the control 701 and the control 702.

Next, in S414, the CPU 203 displays and controls a screen for registering a CA certificate.

Figure 8:
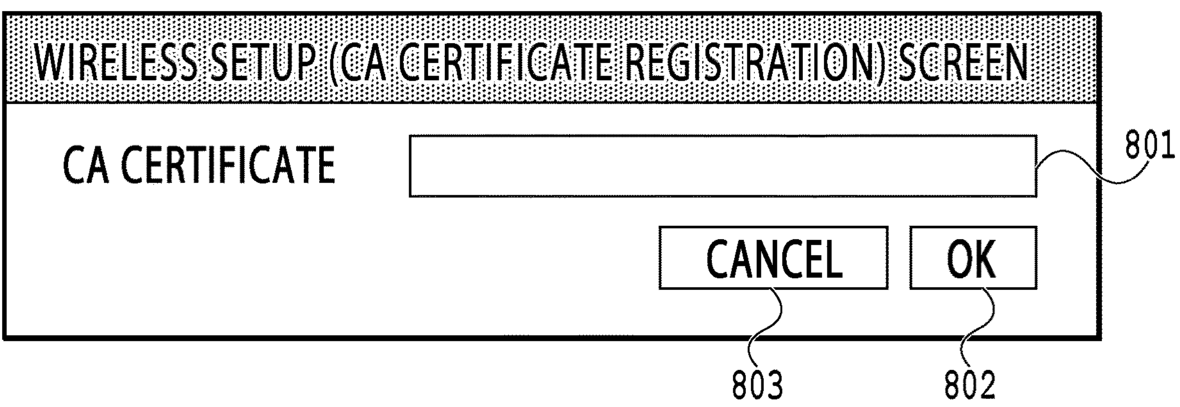
FIG. 8 is a wireless setup (CA certificate registration) screen.

FIG. 8 shows the screen for registering a CA certificate. The screen for registering the CA certificate has a control 801 where the storage location of the CA certificate can be inputted, an OK button 802, and a cancel button 803. The control 801 receives a setting of a folder path storing a CA certificate used for authentication. The CPU 203 ends the setup processing if the cancel button 803 is pressed, and proceeds to processing in S415 if the OK button 802 is pressed. Note that the OK button 802 may be controlled to become pressable after receipt of user input to the control 801. Also, although the present embodiment describes a mode of inputting a folder path storing the CA certificate, a dialog screen for opening a file may be displayed to receive a selection.

Next, in S415, the CPU 203 transmits wireless setup information to the printer 101. The wireless setup information in the present embodiment is the network connection information, the settings inputted for the corresponding authentication method, and certificate information, obtained in S401 to S414. The printer which has received the wireless setup information is connected to the wireless LAN router 103 based on the wireless setup information using the enterprise method. Note that in S415, the CPU 203 transmits the wireless setup information to the printer 101 using the Simple Network Management Protocol (SNMP). Note that the method for communications with the printer is not limited to SNMP in the present embodiment and may be a different protocol. After the processing in S415 is completed, the CPU 203 ends the processing in the present flowchart. Note that after transmitting the wireless setup information to the printer 101, the CPU 203 may switch the connection destination of the information processing apparatus 102 from the printer 101 as the wireless setup target to the wireless LAN router 103.

As thus described, according to the present embodiment, network connection can be easily set up. Specifically, in a case where enterprise connection setup processing of the printer 101 is performed from the information processing apparatus 102, necessary setup items are determined based on the wireless setup information obtained from the OS. This allows a user to be presented with a setup guidance only having the necessary setup items. This consequently can reduce load on a user performing setup for the enterprise method.

Embodiment 2

Embodiment 2 describes an example where the information processing apparatus 102 adds the network connection information on the information processing apparatus 102 to a setup screen display request, issues the setup screen display request to the printer 101, and performs connection processing on a screen displayed on the printer 101.

Figure 9:
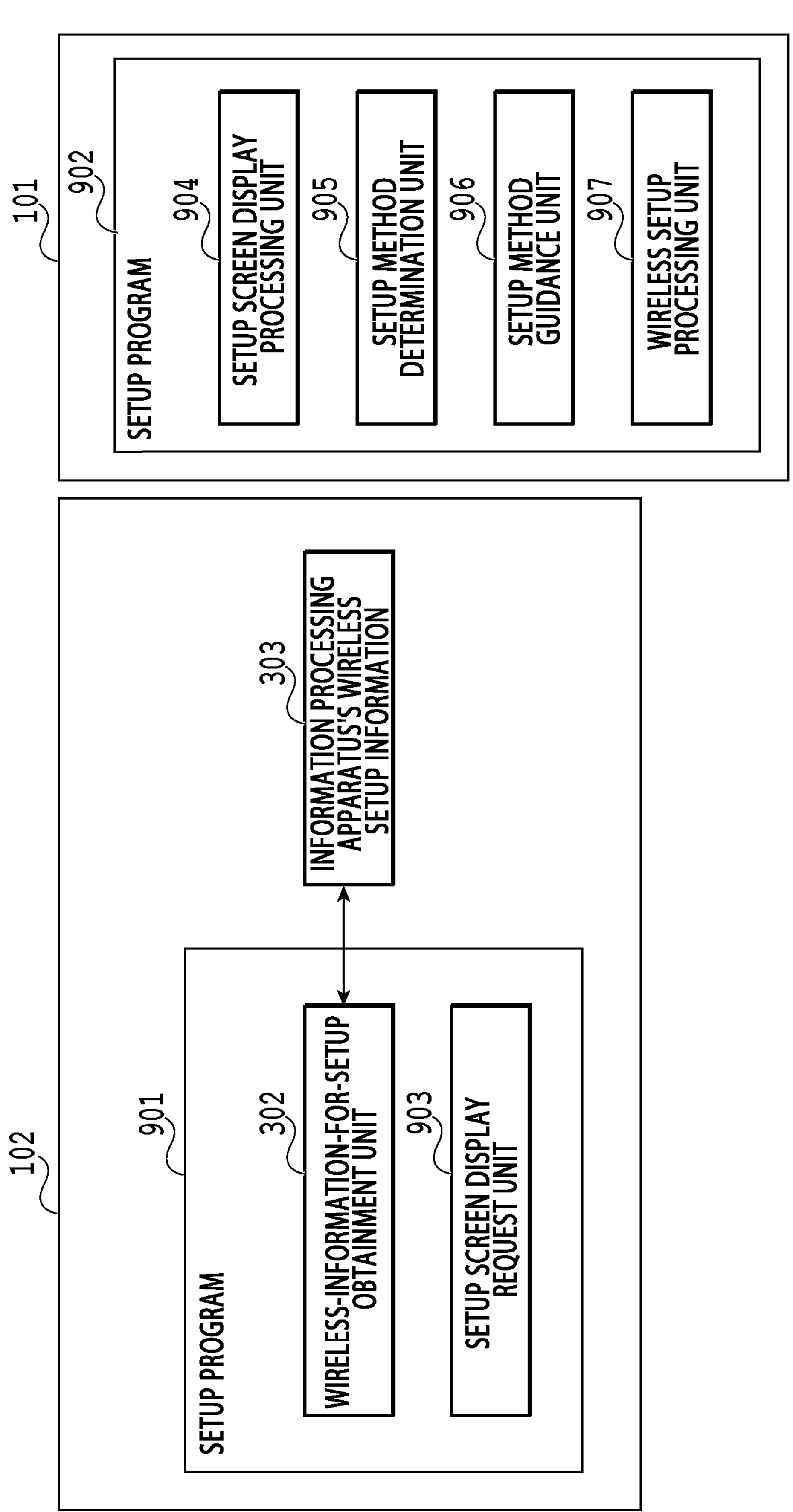
FIG. 9 is a diagram showing example software configurations.

FIG. 9 shows the software configurations of the information processing apparatus 102 and the printer 101 of the present embodiment. In the present embodiment, the information processing apparatus 102 has the wireless-information-for-setup obtainment unit 302, the information processing apparatus's wireless setup information 303, and a setup screen display request unit 903. The printer 101 has a setup screen display processing unit 904, a setup method determination unit 905, a setup method guidance unit 906, and a wireless setup processing unit 907. Also, as shown in FIG. 9, the information processing apparatus 102 has a setup program 901, and the printer 101 has a setup program 902.

The setup program 901 has the screen display processing unit which adds information obtained by the wireless-information-for-setup obtainment unit 302 to a setup screen display request and issues the request to the printer 101. In the present embodiment, information obtained by the wireless-information-for-setup obtainment unit 302 is added to an URL, and an access is made to a web server in the printer 101 through a web browser. The wireless-information-for-setup obtainment unit 302 and the information processing apparatus's wireless setup information 303 are the same as those in FIG. 3 and are therefore not described here.

In the setup program 902, the setup screen display processing unit 904 displays a webpage in response to a display request from the setup screen display request unit 903. The setup method determination unit 905 determines the necessary setup method based on the wireless setup information received from the information processing apparatus 102. The setup method guidance unit 906 presents a guidance of a necessary setup method based on the determination made by the setup method determination unit 905. The wireless setup processing unit 907 performs wireless setup based on the information received from the information processing apparatus 102 and the method presented by the setup method guidance unit 906. Processing performed by the setup programs 901 and 902 is described based on flowcharts given below.

Figure 10A:
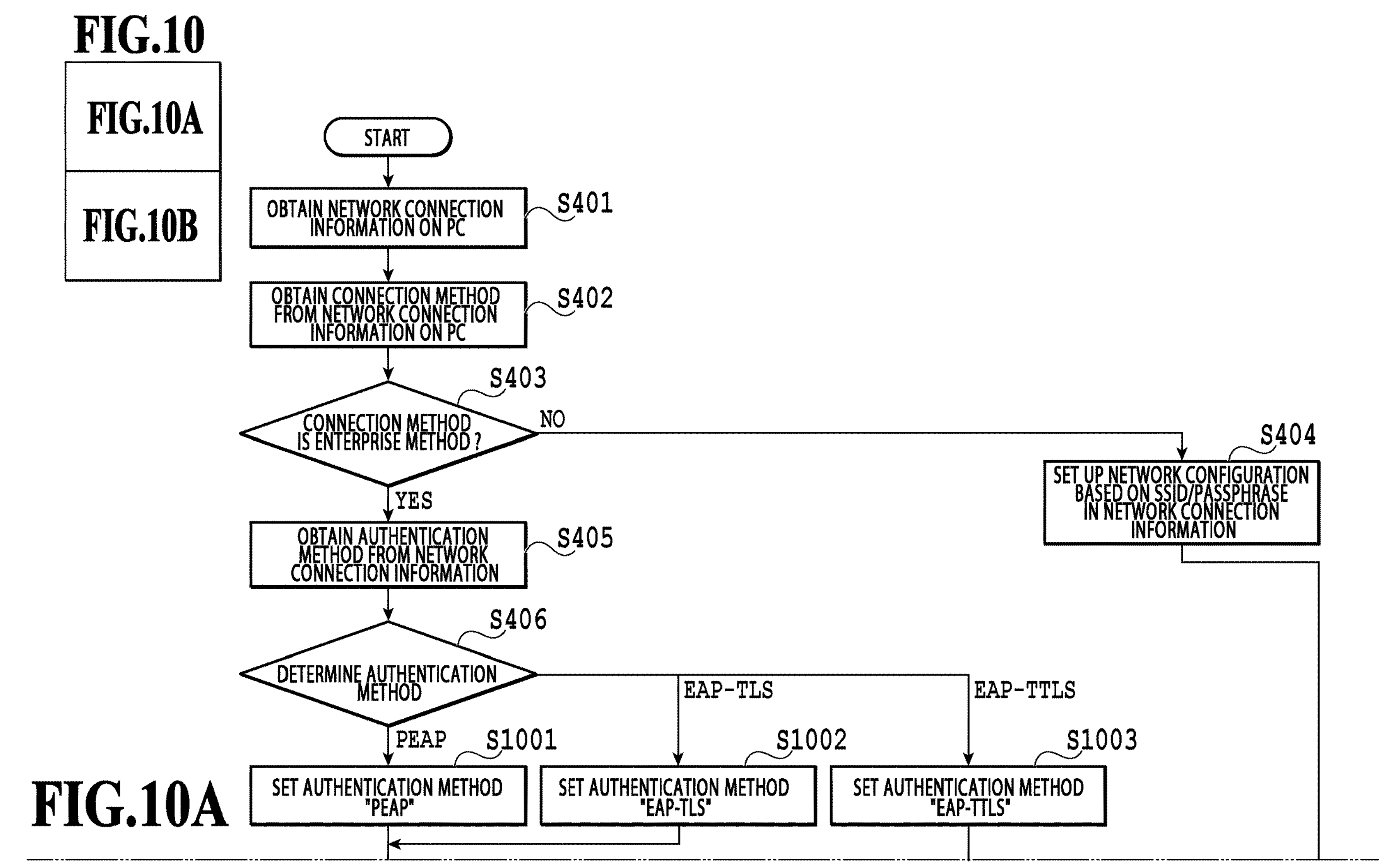
FIGS. 10A and 10B are flowcharts showing the procedure of wireless setup.
Figure 10B:
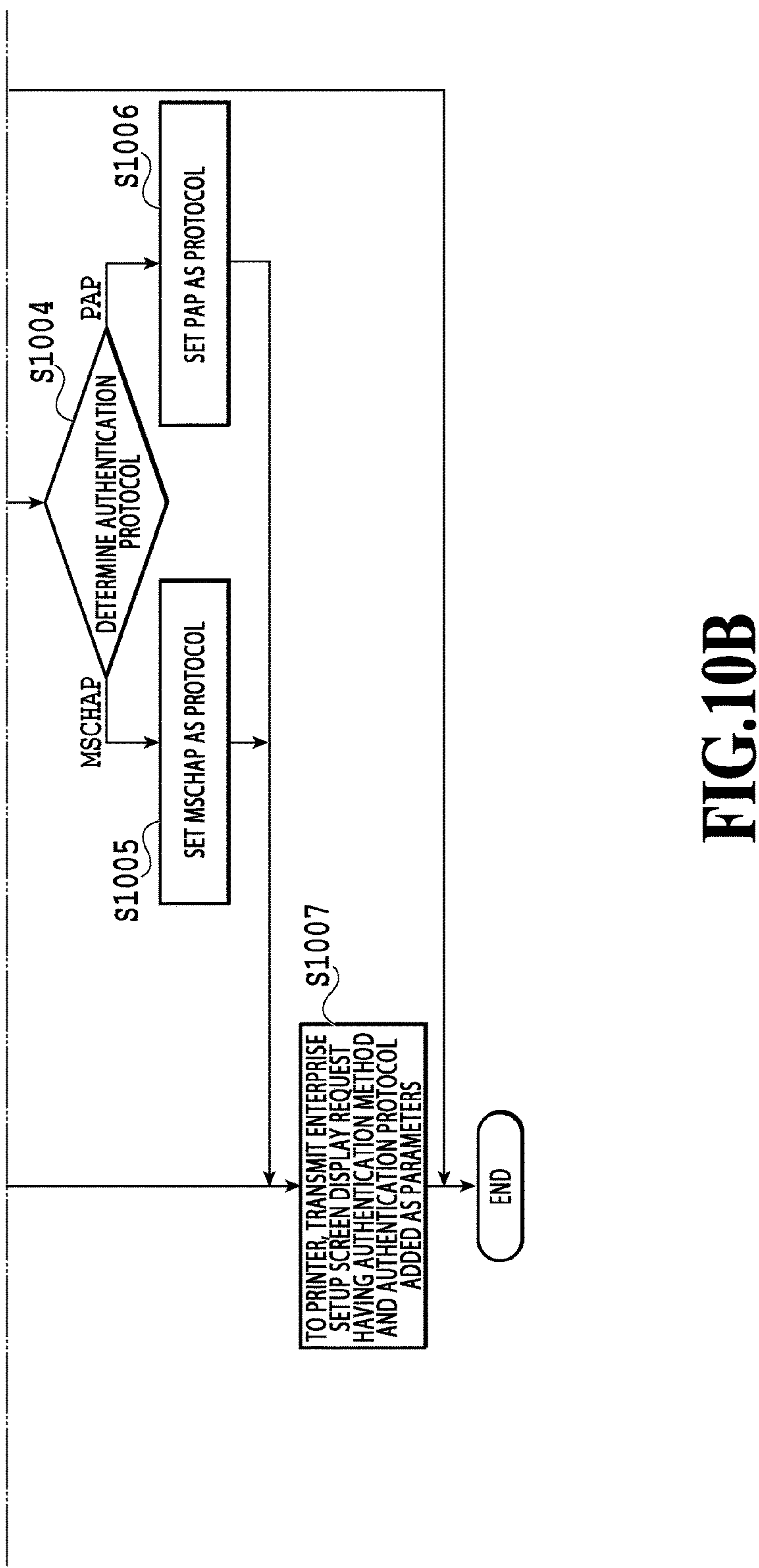

FIG. 10 is a diagram showing the relationship of FIGS. 10A and 10B. FIGS. 10A and 10B are flowcharts showing the procedure of the processing performed by the setup program 901. The present processing is performed by the CPU 203 of the information processing apparatus by loading the setup program 901 stored in the external storage apparatus 206 into the RAM 205 and executing the setup program 901. The present flowchart starts the processing in response to an execution instruction from the CPU 203.

S401 to S406 are the same as those in FIGS. 4A and 4B and are therefore not described. In S1001 to S1006, the CPU 203 determines authentication method information or authentication protocol information to add to the setup screen displayed on the printer 101, and performs processing in accordance with the authentication method or the authentication protocol. In other words, if it is determined in S406 that the authentication method is PEAP, the CPU 203 proceeds to S1001 to set the authentication method PEAP as a parameter to transmit to the printer 101. If it is determined in S406 that the authentication method is EAP-TLS, the CPU 203 proceeds to S1002 to set the authentication method EAP-TLS as a parameter to transmit to the printer 101. If it is determined in S406 that the authentication method is EAP-TTLS, the CPU 203 proceeds to S1003 to set the authentication method EAP-TTLS as a parameter to transmit to the printer 101. Then, authentication protocol information is obtained from the network connection information. In S1004, the CPU 203 determines the authentication protocol. If it is determined that the authentication protocol is MSCHAP, the CPU 203 proceeds to S1005 to set the authentication protocol MSCHAP as a parameter to transmit to the printer 101. If it is determined that the authentication protocol is PAP, the CPU 203 proceeds to S1006 to set the authentication protocol PAP as a parameter to transmit to the printer 101.

In S1007, the CPU 203 adds the authentication method and authentication protocol information thus set to an URL as parameters and transmits a setup screen display request to the printer 101 via a web browser. Although the setup screen is displayed via a web browser in the present embodiment, a different mode may be employed, such as displaying the setup screen within a user interface of an application. After completion of S1007, the CPU 203 ends the present flowchart.

Figure 11:
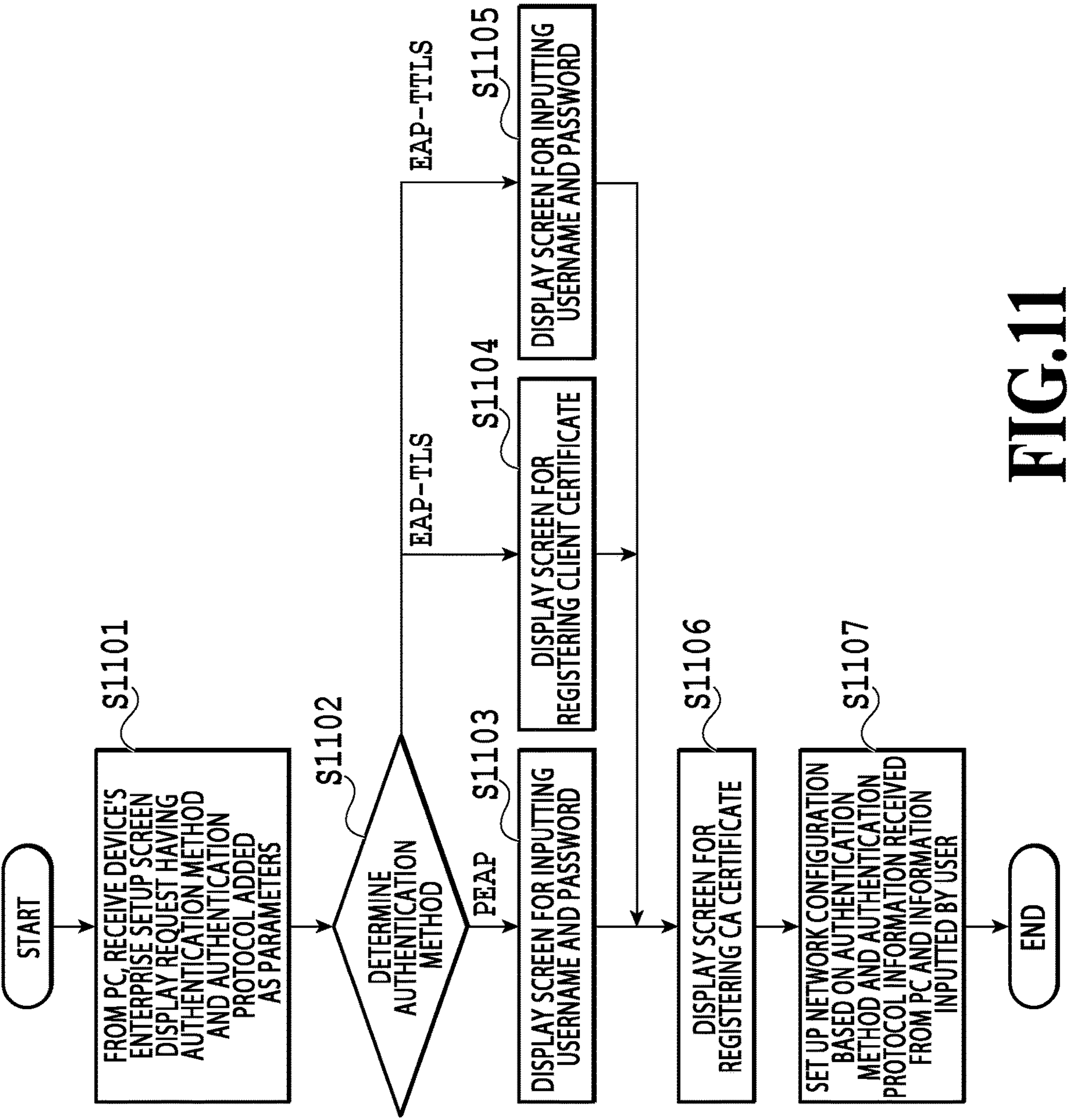
FIG. 11 is a flowchart showing the procedure of wireless setup.

FIG. 11 is a flowchart showing the procedure of processing performed by the setup program 902. In other words, FIG. 11 shows a flowchart performed by the printer 101 to set up network configuration based on the information received from the information processing apparatus 102. The present processing is performed by the CPU 255 of the printer 101 by loading the setup program 902 stored in the ROM 254 into the RAM 253 and executing the setup program 902. In the present flowchart, processing is started in response to an execution instruction from the CPU 255.

First, in S1101, the CPU 255 of the printer receives, from the information processing apparatus 102, a setup screen display request having the authentication method and the authentication protocol added thereto as parameters. In S1102, the CPU 255 determines the authentication method. If it is determined that the authentication method is PEAP, the CPU 255 proceeds to S1103 to display a screen for inputting a username and a password. If it is determined that the authentication method is EAP-TLS, the CPU 255 proceeds to S1104 to display a screen for registering a client certificate. If it is determined that the authentication method is EAP-TTLS, the CPU 255 proceeds to S1105 to display a screen for inputting a username and a password.

In S1106, the CPU 255 displays a screen for registering a CA certificate. In the present embodiment, the screens in S1103 to S1106 are displayed via a web browser. The configuration of the screens displayed are the same as the configurations shown in FIGS. 5 to 8 and are therefore not described here.

Next, in S1107, the CPU 255 sets up network configuration based on the authentication method and authentication protocol information received from the information processing apparatus 102 as well as the setup information received in S1102 to S1105. After completion of the processing in S1107, the CPU 255 ends the present flowchart. Note that after the information processing apparatus 102 transmits the various kinds of information described above to the printer 101, the information processing apparatus 102 may switch the connection destination of the information processing apparatus 102 from the printer 101 as the wireless setup target to the wireless LAN router 103.

As thus described, according to the present embodiment in which the printer 101 obtains information needed for wireless setup from the information processing apparatus 102, wireless setup can be performed on the printer 101 end. This eliminates the need for wireless setup to be performed on the information processing apparatus 102 end, i.e., on the client terminal end. Although the information processing apparatus 102 using Windows as its OS is described as an example of a client terminal in the present embodiment, actually, a different OS may be used, or a mobile terminal may be used. Then, the setup screen may differ depending on the client terminal, which may impose larger load on the user. In the present embodiment, the user performs wireless setup on the screen of the printer no matter which client terminal they use, and consequently, the setup may be less cumbersome.

Other Embodiments

In the above description, the information for connecting the printer 101 to the wireless LAN router 103 to which the information processing apparatus 102 is being connected is transmitted to the printer 101 in response to execution of a predetermined operation. However, the present disclosure is not limited to such a mode. For example, after the connection between the information processing apparatus 102 and the printer 101 is established, the CPU 203 may obtain, from the printer 101, a list of networks found by the printer 101 as a result of a search. Then, the CPU 203 may determine whether the list includes a network formed by the wireless LAN router 103 to which the information processing apparatus 102 is connected at the time of execution of the predetermined operation. If the determination result is YES, the CPU 203 may execute the processing in and after S402 described above. If the determination result is NO, the CPU 203 may display the list and receive a selection from the user. The CPU 203 then may execute the processing in and after S402 described above based on the network information on the network selected. In other words, the processing in and after S402 may be processing for connecting to a network other than the network formed by the wireless LAN router 103 to which the information processing apparatus 102 is connected. Note that the network information on the network selected is obtained from the printer 101. Note that in a mode where the CPU 203 obtains only the list from the printer 101 and not the network information on each of the networks included in the list, the determination in S403 and the determination in S406 do not have to be performed by the CPU 203 automatically based on the network information. Specifically, the CPU 203 may receive user input indicating the connection method and the authentication method for the selected network and execute the determination in S403 and the determination in S406 based on the input.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-152637, filed Sep. 26, 2022, which is hereby incorporated by reference herein in its entirety.

What is claimed is:

1. A method of controlling an information processing apparatus, the method comprising:

receiving a predetermined operation; and based on that a wireless local area network (LAN) router to which the information processing apparatus is connected at a time of the reception of the predetermined operation corresponds to an enterprise method which is an authentication method using an authentication server conforming to IEEE 802.1X protocol, displaying, by the information processing apparatus, at least one input screen for inputting information related to the enterprise method, the at least one input screen corresponding to an authentication method used in the enterprise method;

receiving, via the at least one input screen, setting information for connecting to the wireless LAN router corresponding to the enterprise method; and transmitting, to a communication apparatus, information related to the enterprise method including the setting information and connection information for connecting to the wireless LAN router corresponding to the enterprise method, or based on that the wireless LAN router to which the information processing apparatus is connected at the time of the reception of the predetermined operation corresponds to a personal method which is an authentication method not using the authentication server, transmitting, to the communication apparatus, connection information for connecting to the wireless LAN router corresponding to the personal method.

2. The control method according to claim 1, wherein the at least one input screen includes a screen for inputting a certificate authority (CA) certificate.

3. The control method according to claim 1, wherein the wireless LAN router to which the information processing apparatus is connected at the time of the reception of the predetermined operation and which corresponds to the enterprise method corresponds to one of a plurality of authentication methods including at least one of Extensible Authentication Protocol-Transport Layer Security (EAP-TLS), Extensible Authentication Protocol-Tunneled Transport Layer Security (EAP-TTLS), and Protected Extensible Authentication Protocol (PEAP), and the at least one input screen includes a screen based on to which of the plurality of authentication methods the wireless LAN router corresponds, the wireless LAN router being the wireless LAN to which the information processing apparatus is connected at the time of reception of the predetermined operation and which corresponds to the enterprise method.

4. The control method according to claim 3, wherein a screen based on that the wireless LAN router to which the information processing apparatus is connected at the time of the reception of the predetermined operation and which corresponds to the enterprise method corresponds to the PEAP among the plurality of authentication methods is a screen for inputting a username and a password, the screen being included in the at least one input screen.

5. The control method according to claim 3, wherein a screen based on that the wireless LAN router to which the information processing apparatus is connected at the time of the reception of the predetermined operation and which corresponds to the enterprise method corresponds to the EAP-TLS among the plurality of authentication methods is a screen for inputting a client certificate, the screen being included in the at least one input screen.

6. The control method according to claim 3, wherein a screen based on that the wireless LAN router to which the information processing apparatus is connected at the time of the reception of the predetermined operation and which corresponds to the enterprise method corresponds to the EAP-TTLS among the plurality of authentication methods is a screen for inputting a username and a password, the screen being included in the at least one input screen.

7. The control method according to claim 3, wherein the at least one input screen includes a screen based on to which of the plurality of authentication methods the wireless LAN router corresponds, the wireless LAN router being the wireless LAN to which the information processing apparatus is connected at the time of reception of the predetermined operation and which corresponds to the enterprise method and a screen for inputting a CA certificate.

8. The control method according to claim 1, wherein in a case where the information related to the enterprise method is transmitted to the communication apparatus, at least one input screen for inputting the information related to the enterprise method is displayed by the communication apparatus.

9. The control method according to claim 8, wherein the information related to the enterprise method transmitted to the communication apparatus is a parameter indicative of one of the plurality of authentication methods including at least one of Extensible Authentication Protocol-Transport Layer Security (EAP-TLS), Extensible Authentication Protocol-Tunneled Transport Layer Security (EAP-TTLS), and Protected Extensible Authentication Protocol (PEAP), and the at least one input screen includes a screen based on to which of the plurality of authentication methods the wireless LAN router corresponds, the wireless LAN router being the wireless LAN to which the information processing apparatus is connected at the time of reception of the predetermined operation and which corresponds to the enterprise method.

10. The control method according to claim 9, wherein the at least one input screen includes a screen for inputting a certificate authority (CA) certificate.

11. The control method according to claim 9, wherein the wireless LAN router to which the information processing apparatus is connected at the time of the reception of the predetermined operation and which corresponds to the enterprise method corresponds to one of a plurality of authentication methods including at least one of Extensible Authentication Protocol-Transport Layer Security (EAP-TLS), Extensible Authentication Protocol-Tunneled Transport Layer Security (EAP-TTLS), and PEAP, and the at least one input screen includes a screen based on to which of the plurality of authentication methods the wireless LAN router corresponds, the wireless LAN router being the wireless LAN to which the information processing apparatus is connected at the time of reception of the predetermined operation and which corresponds to the enterprise method.

12. The control method according to claim 1, wherein the communication apparatus is a printing apparatus.

13. The control method according to claim 1, further comprising executing determination processing to determine whether the wireless LAN router to which the information processing apparatus is connected at the time of the reception of the predetermined operation corresponds to the enterprise method or to the personal method, wherein based on a determination that the wireless LAN router to which the information processing apparatus is connected at the time of the reception of the predetermined operation corresponds to the enterprise method, the information related to the enterprise method and the connection information for connecting to the wireless LAN router corresponding to the enterprise method are transmitted to the communication apparatus, or based on a determination that the wireless LAN router to which the information processing apparatus is connected at the time of the reception of the predetermined operation corresponds to the personal method, the connection information for connecting to the wireless LAN router corresponding to the personal method are transmitted to the communication apparatus.

14. The control method according to claim 13, wherein the determination processing is executed based on information related to the wireless LAN router to which the information processing apparatus is connected, the information being obtained from an operating system (OS) of the information processing apparatus.

15. An information processing apparatus, comprising:

at least one processor; and at least one memory including at least one program, wherein the at least one program causes the at least one processor to:

receive a predetermined operation;

display, based on that a wireless local area network (LAN) router to which the information processing apparatus is connected at a time of the reception of the predetermined operation corresponds to an enterprise method which is an authentication method using an authentication server conforming to IEEE 802.1X protocol, at least one input screen for inputting information related to the enterprise method, the at least one input screen corresponding to an authentication method used in the enterprise method;

receive, via the at least one input screen, setting information for connecting to the wireless LAN router corresponding to the enterprise method; and transmit to a communication apparatus, information related to the enterprise method including the setting information and connection information for connecting to the wireless LAN router corresponding to the enterprise method, or based on that the wireless LAN router to which the information processing apparatus is connected at the time of the reception of the predetermined operation corresponds to a personal method which is an authentication method not using the authentication server, transmit connection information for connecting to the wireless LAN router corresponding to the personal method.

16. A non-transitory computer readable storage medium storing a program configured to cause an information processing apparatus to:

receive a predetermined operation;

display, based on that a wireless local area network (LAN) router to which the information processing apparatus is connected at a time of the reception of the predetermined operation corresponds to an enterprise method which is an authentication method using an authentication server conforming to IEEE 802.1X protocol, at least one input screen for inputting information related to the enterprise method, the at least one input screen corresponding to an authentication method used in the enterprise method;

receive, via the at least one input screen, setting information for connecting to the wireless LAN router corresponding to the enterprise method; and transmit, to a communication apparatus, information related to the enterprise method including the setting information and connection information for connecting to the wireless LAN router corresponding to the enterprise method, or based on that the wireless LAN router to which the information processing apparatus is connected at the time of the reception of the predetermined operation corresponds to a personal method which is an authentication method not using the authentication server, transmit connection information for connecting to the wireless LAN router corresponding to the personal method.

17. The control method according to claim 3, wherein in a case where the wireless LAN router corresponds to EAP-TTLS, the method further comprises determining an authentication protocol to be used for the EAP-TTLS from among MSCHAP and PAP based on the connection information, and the information related to the enterprise method transmitted to the communication apparatus includes information indicative of the determined authentication protocol.

18. The control method according to claim 1, wherein the information related to the enterprise method and the connection information are transmitted to the communication apparatus using Simple Network Management Protocol.

19. The control method according to claim 1, wherein the communication apparatus operates as a software access point that forms a wireless network having a predetermined service set identifier (SSID), and the information processing apparatus identifies the communication apparatus by searching for the wireless network having the predetermined SSID and connects to the communication apparatus before transmitting the information related to the enterprise method and the connection information.

* * * * *